(12) United States Patent
Helmick et al.

(10) Patent No.: US 10,017,096 B1
(45) Date of Patent: Jul. 10, 2018

(54) FOLDING BOAT HAULER SYSTEM

(71) Applicants: Bruce W. Helmick, Polk City, FL (US); Karen F. Helmick, Polk City, FL (US)

(72) Inventors: Bruce W. Helmick, Polk City, FL (US); Karen F. Helmick, Polk City, FL (US)

( * ) Notice: Subject to any disclaimer, the term of this patent is extended or adjusted under 35 U.S.C. 154(b) by 190 days.

(21) Appl. No.: 15/262,845

(22) Filed: Sep. 12, 2016

Related U.S. Application Data

(60) Provisional application No. 62/216,549, filed on Sep. 10, 2015.

(51) Int. Cl.
  *B60P 3/00* (2006.01)
  *B60P 3/10* (2006.01)
  *B60P 1/28* (2006.01)

(52) U.S. Cl.
  CPC .............. *B60P 3/1066* (2013.01); *B60P 1/28* (2013.01)

(58) Field of Classification Search
  CPC ................................. B60P 3/1066; B60P 1/28
  USPC ........................................................ 224/403
  See application file for complete search history.

(56) References Cited

U.S. PATENT DOCUMENTS

| | | | | |
|---|---|---|---|---|
| 3,048,291 A | * | 8/1962 | Mabry | B60P 3/1025 414/462 |
| 3,128,893 A | * | 4/1964 | Jones | B60P 3/1025 414/462 |
| 3,170,583 A | * | 2/1965 | Meyer | B60P 3/1025 224/310 |
| 3,343,696 A | * | 9/1967 | Morrison | B60P 3/1025 414/462 |
| 3,460,693 A | * | 8/1969 | Oldham | B60P 3/1025 414/462 |
| 3,550,800 A | * | 12/1970 | Robinson | B60P 3/1058 414/462 |
| 3,648,866 A | * | 3/1972 | Slown | B60P 3/1025 414/462 |
| 3,708,081 A | * | 1/1973 | Schladenhauffen | B60P 3/1025 414/462 |
| 3,732,998 A | | 5/1973 | Martin | |
| 3,734,321 A | | 5/1973 | Long et al. | |
| 3,840,133 A | * | 10/1974 | Berg | B60P 3/1025 414/462 |
| 3,843,002 A | * | 10/1974 | Pihlgren | B60P 3/1025 414/462 |
| 3,871,540 A | * | 3/1975 | Jenkins | B60P 3/1025 414/462 |
| 3,872,989 A | * | 3/1975 | Smithson | B60P 3/1025 254/128 |
| 3,877,594 A | * | 4/1975 | Coakley | B60P 3/1025 414/462 |
| 3,894,643 A | * | 7/1975 | Wilson | B60P 3/1025 414/462 |
| 3,927,779 A | * | 12/1975 | Johnson | B60P 3/1025 414/462 |

(Continued)

*Primary Examiner* — Peter Helvey
(74) *Attorney, Agent, or Firm* — Cramer Patent & Design, PLLC.; Aaron R. Cramer

(57) ABSTRACT

A boat hauler system which provides a folding boat cradling structure capable of being installed within a pickup truck bed. The boat hauler system may be used to transport, launch, and retrieve a small boat from a body of water without employing a boat trailer. The boat hauler system also includes an electric winch and support legs.

20 Claims, 5 Drawing Sheets

(56) References Cited

U.S. PATENT DOCUMENTS

| | | | | |
|---|---|---|---|---|
| 3,972,433 A | * | 8/1976 | Reed | B60P 3/1025 224/310 |
| 4,212,580 A | * | 7/1980 | Fluck | B60P 3/1058 298/1 A |
| 4,234,285 A | * | 11/1980 | Martinez | B60P 3/1025 224/310 |
| 4,239,438 A | * | 12/1980 | Everson | B60P 3/1025 224/310 |
| 4,269,561 A | * | 5/1981 | Rutten | B60P 3/1016 414/462 |
| 4,274,788 A | * | 6/1981 | Sutton | B60P 3/1033 224/310 |
| 4,420,165 A | * | 12/1983 | Goodin | B60P 3/1033 280/414.1 |
| 5,069,595 A | * | 12/1991 | Smith | B60P 3/1025 414/462 |
| 5,108,248 A | | 4/1992 | Murrill | |
| 5,123,799 A | * | 6/1992 | Breazeale | B60P 3/1025 414/462 |
| 5,447,408 A | * | 9/1995 | Smith | B60P 3/1025 414/462 |
| 5,511,928 A | | 4/1996 | Ellis | |
| 5,603,600 A | | 2/1997 | Egan et al. | |
| 5,609,462 A | * | 3/1997 | Reimer | B60P 3/1025 224/310 |
| 5,921,741 A | * | 7/1999 | Heimgartner | B60P 3/1025 414/462 |
| 6,413,033 B1 | | 7/2002 | Monroig, Jr. | |
| 6,739,823 B2 | * | 5/2004 | Shirvell | B60P 3/07 414/462 |
| 7,651,147 B2 | | 1/2010 | Eidsmore | |
| 8,133,000 B2 | | 3/2012 | Olson et al. | |
| 8,376,684 B2 | | 2/2013 | Juarez-Ortega | |

\* cited by examiner

FOLDING BOAT HAULER SYSTEM

RELATED APPLICATIONS

The present invention is a Continuation and claims the benefit of U.S. Provisional Application No. 62/216,549, filed on Sep. 10, 2015, the entire disclosures of which are incorporated herein by reference.

FIELD OF THE INVENTION

The present invention relates generally to the field of small boat launch and recovery devices and more specifically relates to a folding boat hauler system.

BACKGROUND OF THE INVENTION

Small watercraft have a plurality of configurations and functions commonly need to be transported overland and unloaded upon an area of water prior to use. A typical method for solving the transportation need is to use a boat trailer, which is essentially a trailer designed to launch, retrieve, and carry boats.

Typically, the boat trailer is a wheeled, metal structure that is towed behind a vehicle. There are various methods employed to launch and retrieve boats from the boat trailer such as a "roller-style" which uses a series of rollers to roll a boat on and off of the boat trailer. Another type of boat trailer is a "float-style" trailer whereby the boat trailer is partially submerged into the water and the boat is allowed to float in the water and off or on to the boat trailer. For these types of boat trailers, it is desired to use a boat launch ramp at the water body which can lead to long wait times when using popular water bodies at high traffic times.

After the boat is launched, the boat trailer must be taken away from the boat launch ramp and stored until the boat is retrieved, contributing to the need for large parking lots to accommodate both the transporting vehicles and the boat trailers.

In an effort to avoid congested boat launch ramps at popular water sites, owners may opt to launch and retrieve boats in a location where there are no boat launching facilities. The boat trailer may be backed into the water until the boat trailer is inclined and boat slides into the water. However, the trailer may not be able to be placed far enough into the water to properly float the boat for a variety of reasons including needing to avoid soft or sandy terrain, which may cause the boat trailer to sink and get stuck. In addition, when retrieving the boat without a launch ramp, it may be difficult to properly align the boat with the boat trailer for recovery activities.

Other considerations for purchasing a boat trailer are that there are additional expenses for licensing required by the owner's state of residence and maintenance for the boat trailer's tires and electrical lighting system.

A boat dolly is an alternative device used to launch and retrieve small boats into and from the water. Although generally smaller than a boat trailer, a boat dolly has smaller wheels and is not suitable for towing a boat on roadways, thereby creating the need for an additional method of transporting both the boat and the dolly overland.

Various attempts have been made to solve problems found in small boat launch and recovery devices art. Among these are found in: U.S. Pat. No. 4,212,580 by Fluck; U.S. Pat. No. 3,550,800 by Robinson; U.S. Pat. No. 5,354,164 by Goss, et. al.; and U.S. Pat. No. 3,127,041 by Flynn. These prior art references are representative of boat launching means.

None of the above inventions and patents, taken either singly or in combination, is seen to describe the invention as claimed. Thus, a need exists for a reliable folding boat hauler system, and to avoid the above-mentioned problems.

SUMMARY OF THE INVENTION

The device comprises a boat hauling system, comprising a rearward carrier frame having a proximal and distal end, a forward carrier frame having a proximal and distal end, a base frame having a proximal and distal end and a pair of leg supports. The base frame is adapted to be secured to a bed of a vehicle while hingedly secured within the forward carrier frame. Each leg is secured to opposing sides of the rearward carrier frame distal end and are each deployable from a stowed configuration to a deployed state. The rearward carrier frame distal end is pivotally rotatable relative to the base frame distal end constituting a first desired position relative to the base frame. The forward carrier frame distal end is pivotally rotatable relative to the rearward carrier frame distal end constituting a second desired position of relative to the rearward carrier frame. The forward carrier frame distal end is pivotally rotatable relative to the base frame distal end constituting a third desired position relative to the base frame. The first, second and third desired positions are each capable of being secured. In an alternate embodiment a second pair of leg supports are provided with each leg secured to an opposing side of the base frame distal end. The second pair of leg supports are also capable of each being deployable from a stowed configuration to a deployed state.

The rearward carrier frame may also comprise a first rearward carrier frame side member which has a plurality of first rearward hinge apertures that are disposed within the distal end, a second rearward carrier frame side member which has a plurality of second rearward hinge apertures that are disposed within the distal end and a rearward carrier frame end member which spans the distance between and joins the proximal end of the first rearward carrier frame side member to the proximal end of the second rearward carrier frame side member.

The forward carrier frame may also comprise a first forward carrier frame side member which has a plurality of first forward hinge apertures that are disposed within the distal end, a second forward carrier frame side member which has a plurality of second forward hinge apertures that are disposed within the distal end and a forward carrier frame end member which spans the distance between and joins the proximal end of the first forward carrier frame side member to the proximal end of the second forward carrier frame side member. The plurality of the first rearward hinge apertures and the plurality of the second rearward hinge apertures are positioned to be aligned respectively with the plurality of first and second forward hinge apertures.

The base frame may also comprise a first base frame side member which has a plurality of first base hinge apertures that are disposed within a first base frame side member hinge which is integrated into the distal end of the first base frame side member and a second base frame side member which has a plurality of second base hinge apertures that are disposed within a second base frame side member hinge which is also integrated into the distal end of the second base frame side member. The plurality of the first and second forward hinge apertures is positioned to be aligned respectively with the plurality of first and second base hinge apertures. At least one (1) hinge bolt is provided to fit within a series of any aligned first rearward carrier frame side aperture, first forward carrier frame side aperture and first base frame side member hinge. At least one (1) hinge bolt is provided to fit within a series of any aligned second rearward carrier frame side aperture, second forward carrier frame side aperture and second base frame side member hinge.

At least one locking pin may be provided to fit within a series of any aligned first or second rearward carrier frame side aperture, first or second forward carrier frame side aperture, and first or second base frame side member hinge, thereby permitting the securing of the first, second and third desired positions.

A winch assembly may be affixed to the forward carrier end member. The surfaces of the forward and rearward carrier frames comprise a shock-absorbing material.

Each one of the pair of leg supports, whether in the preferred embodiment or alternate embodiment may comprises a leg; a diagonal leg brace which is attached at first end to a central portion of the leg and attached at a second end to the rearward carrier frame distal end and a leveling foot which is deployable from within the distal end of the leg. The diagonal leg brace secures each the leg when in a deployed state. The first and second base frame side members may also comprise of a plurality of chains. Each chain may be individually secured at the chain first end to the first or second base frame side member.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
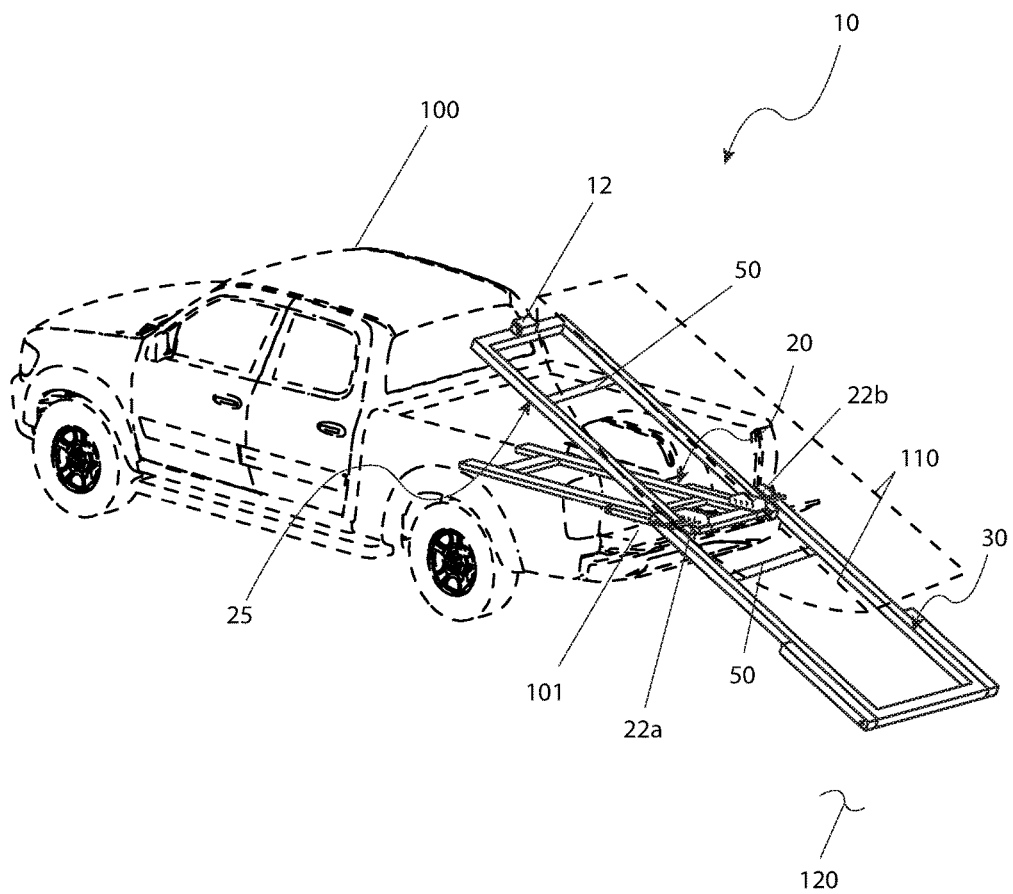
FIG. 1 is a perspective view of a folding boat hauler system 10 depicted being installed upon a vehicle 100, according to a preferred embodiment of the invention.

DESCRIPTIVE KEY 10 folding boat hauler system
12 winch
14 winch mounting bracket
20 base frame
20a first base frame side member
20b second base frame side member
22a first hinge
22b second hinge
25 forward carrier frame
25a first forward carrier side member
25b second forward carrier side member
25c forward carrier end member
30 rearward carrier frame
30a first rearward carrier side member
30b second rearward carrier side member
30c rearward carrier end member
40a first rear support leg
40b second rear support leg
41a first forward support leg
41b second forward support leg
42 leveling foot
43 leg brace
44 hinge aperture
45 hinge bolt
46 locking pin
47 chain
48 eyelet
50 cross-member
80 fastener
100 vehicle
101 tailgate
102 bed
110 boat
120 ground surface

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a folding boat hauler system (herein described as the "system") 10, which provides a boat cradling structure being suitable for installation within an existing vehicle 100, preferably within a bed portion 102 of a pickup truck. The system 10 is used to transport a small boat 110 as well as, launch and retrieve the small boat 110 from a body of water without employing a cumbersome boat trailer and having to perform associated towing or backing up tasks. Models of the system 10 are envisioned to be made available having dimensions which correspond to a size of the vehicle 100 as well as the size of the intended boat 110 to be transported.

Referring now to FIG. 1, a perspective view of the system 10 in an installed condition within a vehicle 100, is disclosed. The system 10 provides hingedly connected portions including a base frame 20, a forward carrier frame 25, and a rearward carrier frame 30. The base frame 20 is preferably stationarily affixed to the bed 102 of the vehicle 100 and provides a means to tilt the carrier frame portions 25, 30 to load and launch the boat 110. The carrier frame portions 25, 30 act to jointly support respective end portions of the small boat 110. In use, the carrier frame portions 25, 30 are locked in a coplanar manner so as to effectively position the small boat 110 in either a horizontal state, suitable for normal transport of the boat 110, or at a tilted orientation (as seen here), to load or launch the boat 110.

A typical unit of the system 10 is envisioned to be approximately thirty inches (30 in.) in width and fifteen feet (15 ft.) in length when in a deployed state. The major portions of the system 10 are envisioned to be made using a combination of treated lumber, aluminum shapes, and shock-absorbing materials.

Figure 2:
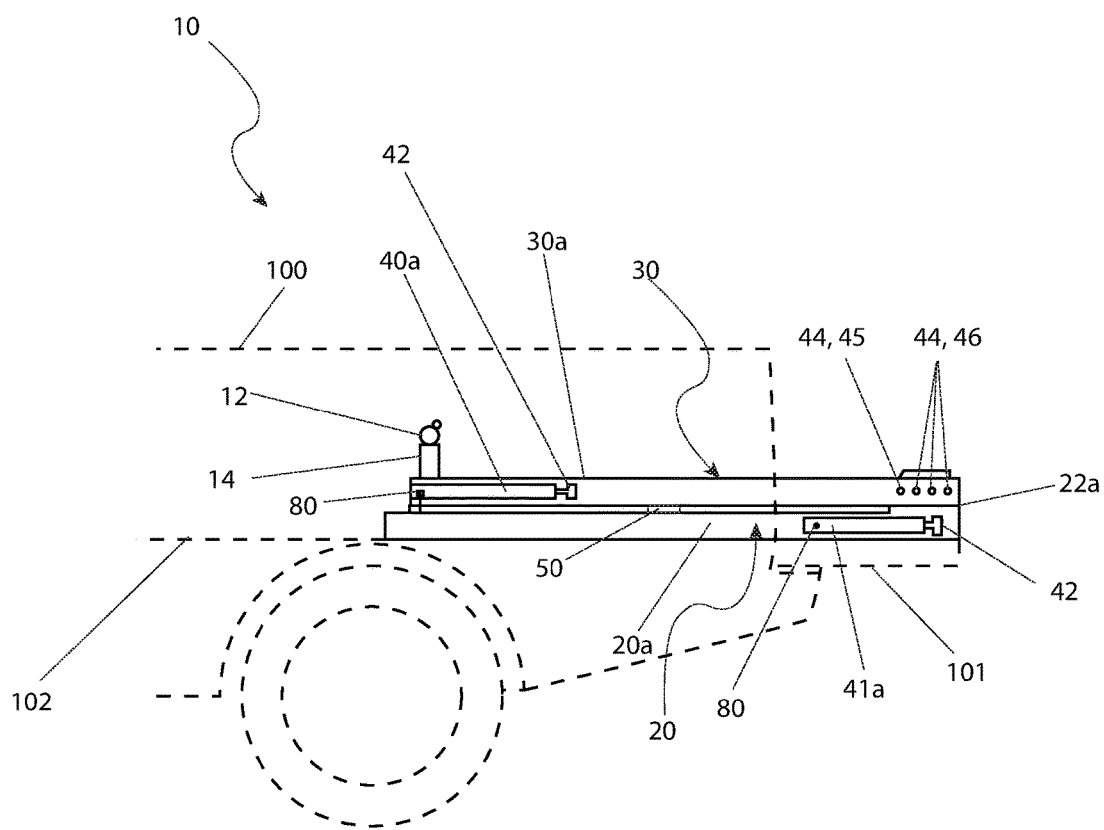
FIG. 2 is a side view of the folding boat hauler system 10 depicting a stowed state upon the vehicle 100, according to a preferred embodiment of the invention.
Figure 3:
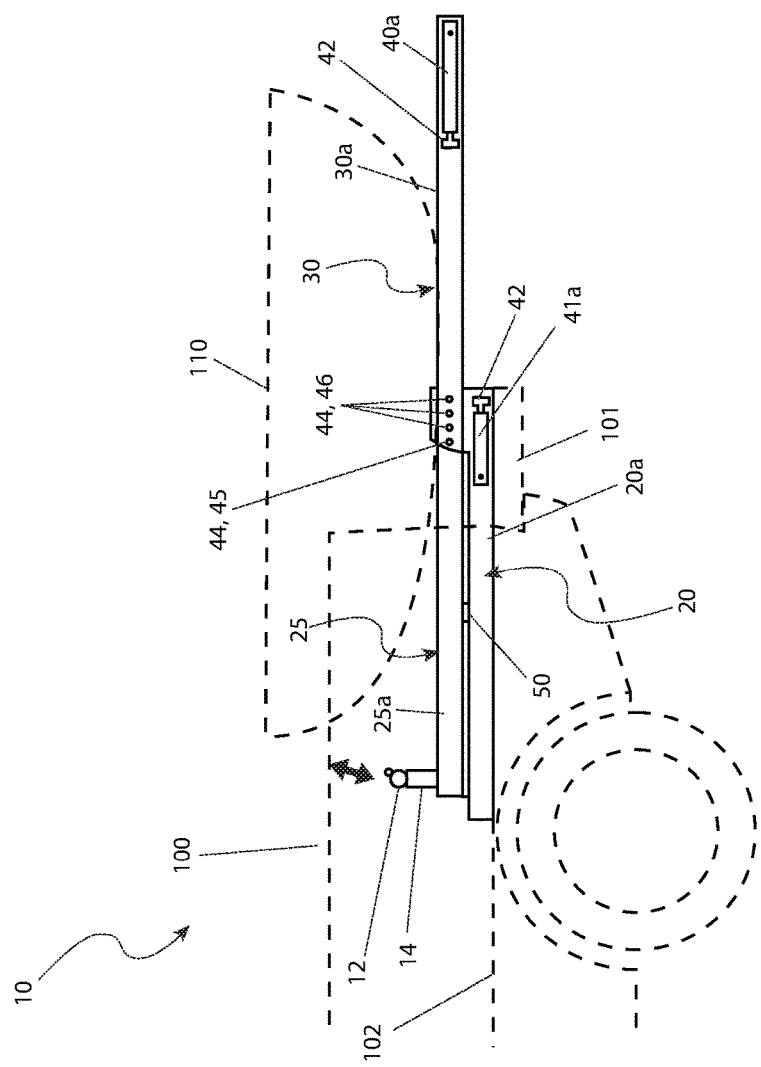
FIG. 3 is another side view of the folding boat hauler system 10 depicting deployment of a rearward carrier frame portion 30, according to a preferred embodiment of the invention.

Referring now to FIGS. 2 and 3, side views of the system 10 in respective stowed and deployed states upon the vehicle 100, according to a preferred embodiment of the invention, are disclosed. The base frame 20 provides parallel linear members including a first base frame side member 20a and a second base frame side member 20b. The first and second base frame side members 20a, 20b are preferably affixed to opposing side portions of the bed 102 using a plurality of chains 47, corresponding eyelets 48, and/or other appropriate hardware such as D-clips, to provide a rigid and resilient connection to the vehicle 100 (also see FIG. 4). The first and second base frame side members 20a, 20b are held in relative position to each other by at least one (1) perpendicularly interconnecting cross-member 50 (see FIG. 5).

The forward carrier frame 25 provides a "U"-shaped structure having parallel opposing first forward carrier side member 25a and second forward carrier side member 25b portions, being perpendicularly connected to each other at one (1) end by a forward carrier end member 25c. In a similar manner, the rearward carrier frame 30 provides a "U"-shaped structure having opposing parallel first rearward carrier side member 30a and second rearward carrier side member 30b portions, being perpendicularly connected at one (1) end by a rearward carrier end member 30c. Each forward carrier side member 25b, 25b and each rearward carrier side member 30a, 30b includes a plurality of equally-spaced hinge apertures 44 arranged along a horizontal line, located adjacent to free end portions. Each hinge aperture 44 extends through a free end of the carrier side members 25b, 25b, 30a, 30b.

The aforementioned first and second base frame side members 20a, 20b further include integral first hinge 22a and second hinge 22b portions at respective rearward end portions thereof. The hinges 22a, 22b also include a plurality of hinge apertures 44 arranged along a horizontal line in an equally-spaced manner, having like spacing and size as the hinge aperture portions 44 of the carrier side members 25b, 25b, 30a, 30b.

The hinged attachment of the forward carrier frame 25 and the rearward carrier frame 30 to the hinges 22a, 22b is accomplished via insertion of a hinge pin 45 through correspondingly aligned hinge aperture 44 portions of the first forward carrier side member 25a, first hinge 22a, and the first rearward carrier side member 30a, on one (1) side of the system 10. Another hinge pin 45 is inserted in like manner through hinge aperture portions 44 of the opposing second forward carrier side member 25b, second hinge 22b, and the second rearward carrier side member 30b (see FIG. 5). The hinge apertures 44 are drilled or otherwise formed through the hinges 22a, 22b and carrier frames 25, 30. The hinge pins 45 act as axles, allowing independent rotation of the carrier frames 25, 30 (see FIGS. 1 and 4).

The system 10 also includes a plurality of locking pins 46 which may be inserted into the remaining hinge aperture 44 portions of the hinges 22a, 22b and carrier frames 25, 30 to lock and retain an orientation of the portions of the system 10. In use, the locking pins 46 are utilized to secure a coplanar relationship between the forward carrier frame 25 and the rearward carrier frame 30, via insertion of the locking pins 46 through aligned hinge aperture 44 portions of the carrier frames 25, 30. Furthermore, the locking pins 46 may be inserted through the carrier frames 25, 30 and hinge aperture portions 44 of the hinges 22a, 22b to secure the carrier frames 25, 30 in a horizontal plane during the stowed and transport states of the system 10 as shown in FIGS. 2 and 3.

The system 10 is depicted in FIG. 2 in a compact stowed state upon the bed 102 and tailgate 101 portions of the vehicle 100. In FIG. 3, the forward carrier frame 25 and rearward carrier frame 30 portions are deployed and secured in a coplanar manner along a horizontal plane, illustrated here supporting a small boat 110. In use, the locking pins 46 would be partially withdrawn from the hinges 22a, 22b, thereby allowing the carrier frames 25, 30 to be tilted for unloading/launching of the boat 110 (see FIG. 1).

The system 10 provides a motorized winch 12 and corresponding winch mounting bracket 14, both mounted at an intermediate position upon the forward carrier end member 25c using methods such as fasteners or welding. The winch 12 is envisioned to be a purchased cable-type electrical unit having sufficient load rating to pull the small boat 110 onto the system 10.

Both the forward carrier frame 25 and rearward carrier frame 30 may include permanently affixed cross-members 50 to aid in rigidity and resiliency. The outward surfaces of the forward carrier frame 25 and rearward carrier frame 30 may be covered with a fabric or other shock-absorbing material to aid in protection and friction-free sliding of the boat 110 when loading and off-loading.

Figure 4:
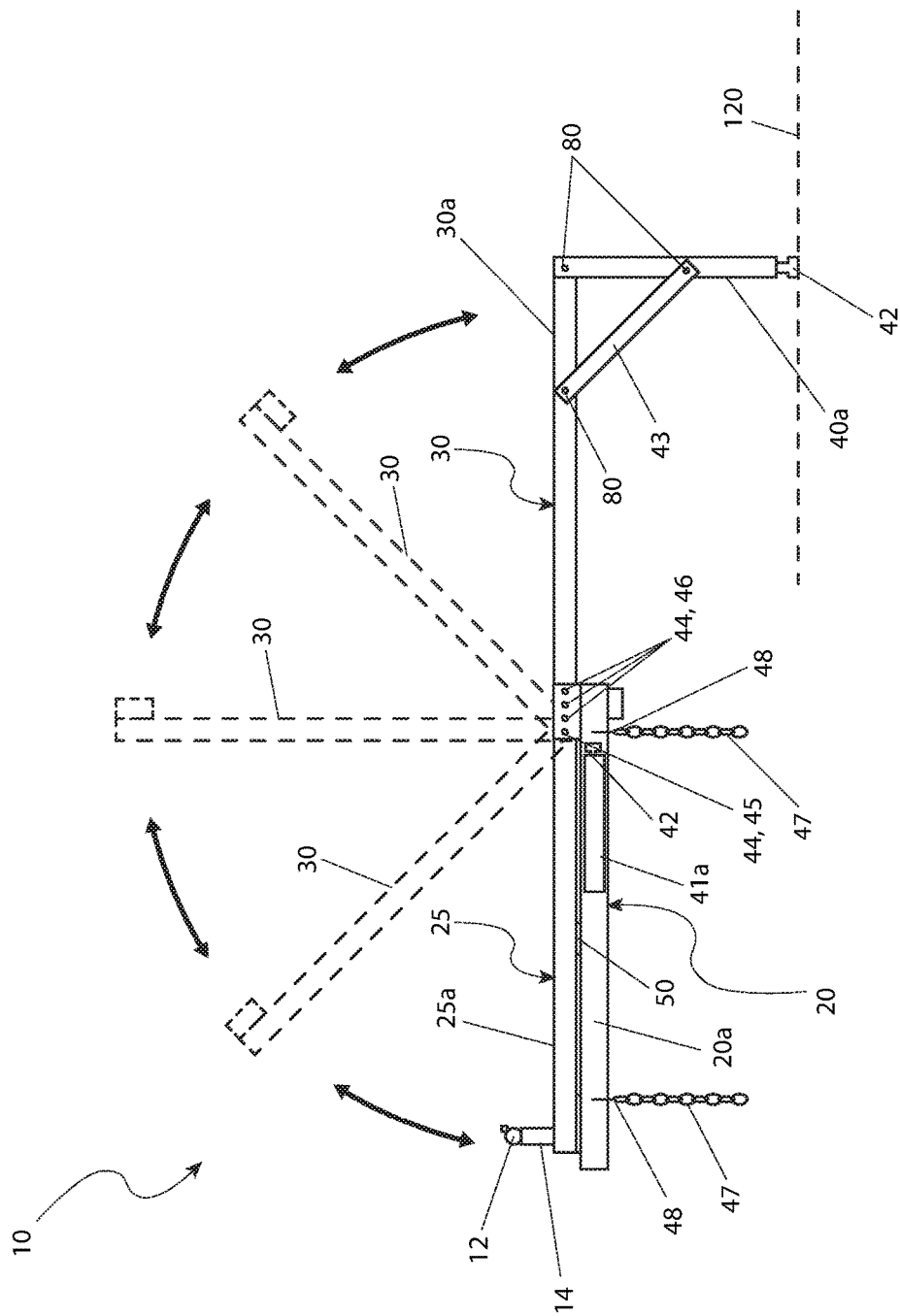
FIG. 4 is a side perspective view of the folding boat hauler system 10 depicting a motioning of the rearward carrier 30 from a folded state to a deployed state, according to a preferred embodiment of the invention; and, FIG. 5 is a bottom view of the folding boat hauler system 10 depicting the rearward carrier frame portion 30 being in a deployed state, according to a preferred embodiment of the invention.

Referring now to FIG. 4, a side perspective view illustrating the rearward carrier 30 in motion from a folded state to a deployed state, according to a preferred embodiment of the invention, is disclosed. The system 10 provides a pair of rear support legs 40a, 40b which are pivotally attached to side surface portions of the first 30b and second 30b rearward carrier side members of the rearward carrier frame 30 via fasteners 80 such as bolts (also see FIG. 5). In a similar manner, a pair of forward support legs 41a, 41b are provided, being pivotally mounted to side surface portions of the first 25a and second 25b forward carrier side members. It is envisioned that the system 10 would be repositioned slightly in a rearward direction along the bed 102, thereby positioning the forward legs 41a, 41b slightly beyond the tailgate 101. In this configuration, the forward support legs 41a, 41b, being pivotally attached to the base frame 20, may be extended downward to a vertical orientation, thereby securely supporting an intermediate portion of the system 10 upon a ground surface 120, in a similar manner as the rear support legs 40a, 40b.

Each of the support legs 40a, 40b, 41a, 41b also includes a diagonal leg brace 43 and a threaded leveling foot portion 42 to stabilize the support legs 40a, 40b, 41a, 41b and to compensate for an uneven ground surface 120. The support legs 40a, 40b, 41a, 41b and leg braces 43 are envisioned to be secured using a plurality of connecting fasteners 80 to form a rigid structure when in the deployed state. The leg braces 43 are also envisioned to be capable of locking in an open position and unlocking and folding at central point of the leg brace 43 in a closed position. An example of such a leg brace 43 is the Stanley™ 446 Heavy Duty Leg Brace. Any or all of the support legs 40a, 40b, 41a, 41b may be deployed to support the system 10 based upon loading, terrain, and the like, to provide additional support to the boat 110 and system 10 during loading and retrieval operations.

Once installed, the system 10 may provide a loading and support structure which extends from the rear of a bed 102 of the vehicle 100. The base frame 20 overlays and extends forward upon the bed 102 of the vehicle 100 and the tailgate 101, in a horizontal position. When unfolded, the rearward carrier frame portion 30 of the system 10 may be manually guided and secured in a coplanar position relative to the forward carrier frame 25 using the previously described hinges 22a, 22b, hinge pins 45, and locking pins 46. Subsequently, the forward 25 and rearward 30 carrier frames may be manually guided as an assembly towards the ground surface 120 for convenient loading or unloading of a small boat 110. A cable portion of the winch 12 may be attached to the boat 110, if desired, to allow for controlled accent or descent of the boat 110 during the loading and unloading operations, as well as when placing the boat 110 in the water. During retrieval operations, the winch 12 and cable portion may assist with pulling the boat 110 on to the forward 25 and rearward 30 frames.

Figure 5:
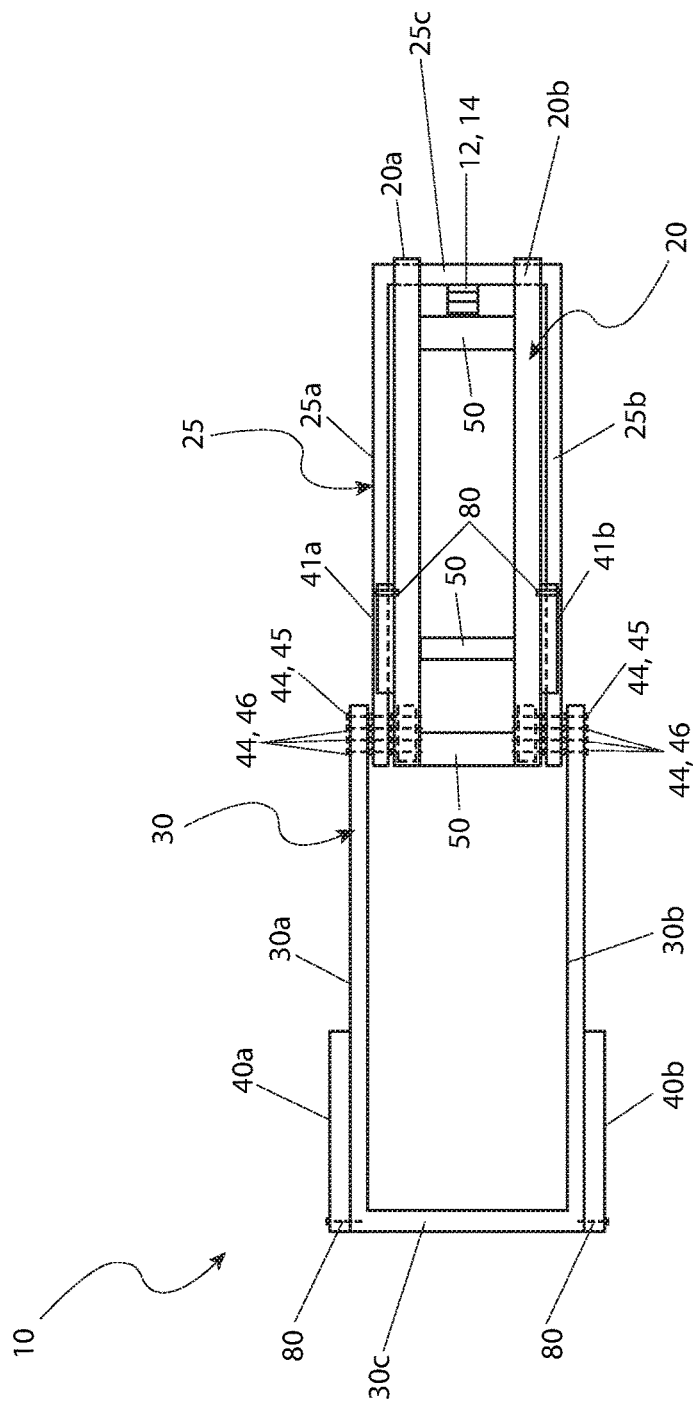

Referring now to FIG. 5, a bottom view of the system 10 depicting the rearward carrier frame portion 30 in a deployed state, according to a preferred embodiment of the invention, is disclosed. The system 10 includes a plurality of members and elements constructed and arranged to provide the base frame 20, the hinged forward carrier frame 25, the electric winch 12, and the rearward carrier frame 30. The hinge portions 22a, 22b of the base frame 20 provide a means to secure the portions of the system 10 in various configurations using the hinge pins 45 and the locking pins 46, to secure the system for launching and retrieving a small boat 110.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1, 2, and 4.

The method of installing and preparing the system 10 for use may be achieved by performing the following steps: procuring a model of the system 10 having overall dimensions suitable to the vehicle 100 and the boat 110 to be transported/launched; placing the tailgate portion 101 of the vehicle 100 in a lowered horizontal position; loading and mounting the base frame 20 onto the bed 102 of the vehicle 100 using the provided chains 47 or an equivalent securing method, and the corresponding hardware; placing the forward 25 and rearward 30 carrier frames in their stowed positions upon the base frame 20; and, attaching the forward 25 and rearward 30 carrier frames to the hinge portions 22a, 22b of the base frame 20 by inserting the hinge pins 45 and the locking pins 46 into the aligned hinge apertures 44. The system 10 is now ready for use.

The method of utilizing the system 10 to load a small boat 110 onto the system 10 may be achieved by performing the following steps: removing the locking pins 46 from the hinges 22a, 22b; deploying the rearward carrier frame 30 by rotating the carrier frame 30 in a rearward direction about the hinge pins 45 from the stowed state rearwardly to the deployed state; securing the forward carrier frame 25 and rearward carrier frame 30 portions in a coplanar manner by reinserting the locking pins 46 through hinge apertures 44 of the forward carrier frame 25 and the rearward carrier frame 30; positioning the carrier frames 25, 30 to a tilted loading position by manually guiding the carrier frames 25, 30 towards the ground surface 120 until making contact; attaching the cable portion of the winch 12 to the boat 110; utilizing the electric winch 12 to enable a controlled accent of the boat 110 onto the carrier frames 25, 30; returning the carrier frames 25, 30 and the loaded boat 110 to a horizontal orientation; reinserting the locking pins 46; providing additional securement between the boat 110 and the system 10 and/or the vehicle 100 as necessary; and, transporting the boat 110 over roadways, using the vehicle 100.

The method of utilizing the system 10 to launch the loaded boat 110 into a body of water, may be achieved by performing the following steps: removing the locking pins 46 from the hinges 22a, 22b; positioning the carrier frames 25, 30 to a tilted boat launching position by manually guiding the carrier frames 25, 30 and included boat 110 until contacting a water surface; and, using the control portions of the winch 12 to extend the cable portion and enable a controlled decent of the boat 110 into the water.

When arriving at a launch point, the user can back the vehicle 100 up the edge of the water at virtually any point without the use of a boat ramp. This process does not require a cumbersome boat trailer that is difficult to tow or backup, nor does it require the use of often crowded boat launch ramps.

The method of loading the boat 110 back onto the system 10 following use of the boat 110 may be accomplished in like manner as the initial loading of the boat 100 described above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A boat hauling system, comprising:
   a rearward carrier frame comprising:
      a rearward carrier frame proximal end; and,
      a rearward carrier frame distal end;
   a forward carrier frame, hingedly secured within said rearward carrier frame, comprising:
      a forward carrier frame proximal end; and,
      a forward carrier frame distal end;
   a base frame, adapted to be secured to a bed of a vehicle and hingedly secured within said forward carrier frame, comprising:
      a base frame proximal end; and,
      a base frame distal end;
   a pair of leg supports, each secured to opposing sides of said rearward carrier frame distal end, each deployable from a stowed configuration to a deployed state;
   wherein said rearward carrier frame distal end is pivotally rotatable relative to said base frame distal end to a first desired position of said rearward carrier frame relative to said base frame;
   wherein said forward carrier frame distal end is pivotally rotatable relative to said rearward carrier frame distal end to a second desired position of said forward carrier frame relative to said rearward carrier frame;
   wherein said forward carrier frame distal end is pivotally rotatable relative to said base frame distal end to a third desired position of said forward carrier frame relative to said base frame; and, wherein said first desired position, said second desired position, and said third desired position are each capable of being secured.

2. The system of claim 1, wherein said rearward carrier frame further comprises:
a first rearward carrier frame side member having a plurality of first rearward hinge apertures disposed within a distal end thereof;
a second rearward carrier frame side member having a plurality of second rearward hinge apertures disposed within a distal end thereof; and,
a rearward carrier frame end member spanning a distance between and joining a proximal end of said first rearward carrier frame side member and a proximal end of said second rearward carrier frame side member.

3. The system of claim 2, wherein said forward carrier frame further comprises:
a first forward carrier frame side member having a plurality of first forward hinge apertures disposed within a distal end thereof;
a second forward carrier frame side member having a plurality of second forward hinge apertures disposed within a distal end thereof; and,
a forward carrier frame end member spanning a distance between and joining a proximal end of said first forward carrier frame side member to a proximal end of said second forward carrier frame side member;
wherein said plurality of first rearward hinge apertures and said plurality of second rearward hinge apertures are positioned to be aligned respectively with said plurality of first forward hinge apertures and said plurality of second forward hinge apertures.

4. The system of claim 3, wherein said base frame further comprises:
a first base frame side member having a plurality of first base hinge apertures disposed within a first base frame side member hinge integrated into a distal end of said first base frame side member; and,
a second base frame side member having a plurality of second base hinge apertures disposed within a second base frame side member hinge integrated into a distal end of said second base frame side member;
wherein said plurality of first forward hinge apertures and said plurality of second forward hinge apertures are positioned to be aligned respectively with said plurality of first base hinge apertures and said plurality of second base hinge apertures;
wherein at least one first hinge bolt is provided to fit within a series of any aligned first rearward carrier frame side aperture, first forward carrier frame side aperture and first base frame side member hinge; and,
wherein at least one second hinge bolt is provided to fit within a series of any aligned second rearward carrier frame side aperture, second forward carrier frame side aperture and second base frame side member hinge.

5. The system of claim 4, wherein at least one locking pin is provided to fit within a series of any aligned first rearward carrier frame side aperture, first forward carrier frame side aperture, and first base frame side member hinge, thereby securing said first desired position, said second desired position or said third desired position.

6. The system of claim 4, wherein at least one locking pin is provided to fit within a series of any aligned second rearward carrier frame side aperture, second forward carrier frame side aperture and second base frame side member hinge, thereby securing said first desired position, said second desired position or said third desired position.

7. The system of claim 3, further comprising a winch assembly affixed to said forward carrier end member.

8. The system of claim 1, wherein surfaces of said forward carrier frame and said rearward carrier frame comprise a shock-absorbing material.

9. The system of claim 1, wherein each one of said pair of leg supports comprises:
a leg;
a diagonal leg brace, attached at first end to a central portion of said leg and attached at a second end rearward carrier frame distal end, which secures each said leg when in a deployed state; and,
a leveling foot deployable from within a distal end of said leg.

10. The system of claim 1, wherein said first base frame side member and said second base frame side member further comprise a plurality of chains each individually secured at a chain first end to said first base frame side member and said second base frame side member.

11. A boat hauling system, comprising:
a rearward carrier frame comprising:
a rearward carrier frame proximal end; and,
a rearward carrier frame distal end;
a forward carrier frame, hingedly secured within said rearward frame, comprising:
a forward carrier frame proximal end; and,
a forward carrier frame distal end;
a base frame, adapted to be secured to a bed of a vehicle and hingedly secured within said forward carrier frame, comprising:
a base frame proximal end; and,
a base frame distal end;
a pair of first leg supports, each secured to opposing sides of said rearward carrier frame distal end, each deployable from a stowed configuration to a deployed state; and,
a pair of second leg supports, each secured to opposing sides of said base frame distal end, each deployable from a stowed configuration;
wherein said rearward carrier frame distal end is pivotally rotatable relative to said base frame distal end to a first desired position of said rearward carrier frame relative to said base frame;
wherein said forward carrier frame distal end is pivotally rotatable relative to said rearward carrier frame distal end to a second desired position of said forward carrier frame relative to said rearward carrier frame;
wherein said forward carrier frame distal end is pivotally rotatable relative to said base frame distal end to a third desired position of said forward carrier frame relative to said base frame; and,
wherein said first desired position, said second desired position, and said third desired position are each capable of being secured.

12. The system of claim 11, wherein said rearward carrier frame further comprises:
a first rearward carrier frame side member having a plurality of first rearward hinge apertures disposed within a distal end thereof;
a second rearward carrier frame side member having a plurality of second rearward hinge apertures disposed within a distal end thereof; and,
a rearward carrier frame end member spanning a distance between and joining a proximal end of said first rearward carrier frame side member and a proximal end of said second rearward carrier frame side member.

13. The system of claim 12, wherein said forward carrier frame further comprises:
- a first forward carrier frame side member having a plurality of first forward hinge apertures disposed within a distal end thereof;
- a second forward carrier frame side member having a plurality of second forward hinge apertures disposed within a distal end thereof; and,
- a forward carrier frame end member spanning a distance between and joining a proximal end of said first forward carrier frame side member to a proximal end of said second forward carrier frame side member;
- wherein said plurality of first rearward hinge apertures and said plurality of second rearward hinge apertures are positioned to be aligned respectively with said plurality of first forward hinge apertures and said plurality of second forward hinge apertures.

14. The system of claim 13, wherein said base frame further comprises:
- a first base frame side member having a plurality of first base hinge apertures disposed within a first base frame side member hinge integrated into a distal end of said first base frame side member; and,
- a second base frame side member having a plurality of second base hinge apertures disposed within a second base frame side member hinge integrated into a distal end of said second base frame side member;
- wherein said plurality of first forward hinge apertures and said plurality of second forward hinge apertures are positioned to be aligned respectively with said plurality of first base hinge apertures and said plurality of second base hinge apertures;
- wherein at least one first hinge bolt is provided to fit within a series of any aligned first rearward carrier frame side aperture, first forward carrier frame side aperture and first base frame side member hinge; and,
- wherein at least one second hinge bolt is provided to fit within a series of any aligned second rearward carrier frame side aperture, second forward carrier frame side aperture and second base frame side member hinge.

15. The system of claim 14, wherein at least one locking pin is provided to fit within a series of any aligned first rearward carrier frame side aperture, first forward carrier frame side aperture, and first base frame side member hinge, thereby securing said first desired position, said second desired position or said third desired position.

16. The system of claim 14, wherein at least one locking pin is provided to fit within a series of any aligned second rearward carrier frame side aperture, second forward carrier frame side aperture and second base frame side member hinge, thereby securing said first desired position, said second desired position or said third desired position.

17. The system of claim 13, further comprising a winch assembly affixed to said forward carrier end member.

18. The system of claim 11, wherein surfaces of said forward carrier frame and said rearward carrier frame comprise a shock-absorbing material.

19. The system of claim 11, wherein each one of said pair of first leg supports and said pair of second leg supports comprises:
- a leg;
- a diagonal leg brace, attached at first end to a central portion of said leg and attached at a second end rearward carrier frame distal end, which secures each said leg when in a deployed state; and,
- a leveling foot deployable from within a distal end of said leg.

20. The system of claim 11, wherein said first base frame side member and said second base frame side member further comprise a plurality of chains each individually secured at a chain first end to said first base frame side member and said second base frame side member.

* * * * *